(12) United States Patent
Tomita

(10) Patent No.: US 10,135,812 B2
(45) Date of Patent: Nov. 20, 2018

(54) AUTHENTICATING SYSTEM, INFORMATION PROCESSING DEVICE, AUTHENTICATING METHOD AND NON-TRANSITORY COMPUTER READABLE RECORDING MEDIUM

(71) Applicant: Konica Minolta, Inc., Chiyoda-ku (JP)

(72) Inventor: Kouichi Tomita, Kawanishi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 67 days.

(21) Appl. No.: 14/210,831

(22) Filed: Mar. 14, 2014

(65) Prior Publication Data

US 2014/0289837 A1 Sep. 25, 2014

(30) Foreign Application Priority Data

Mar. 25, 2013 (JP) ................................. 2013-061731

(51) Int. Cl.
*H04L 29/06* (2006.01)
*H04N 1/44* (2006.01)

(52) U.S. Cl.
CPC ......... *H04L 63/0838* (2013.01); *H04N 1/442* (2013.01); *H04N 1/4413* (2013.01); *H04N 1/4426* (2013.01)

(58) Field of Classification Search
CPC .................................................. H04L 63/0884
See application file for complete search history.

(56) References Cited

U.S. PATENT DOCUMENTS 8,132,242 B1 * 3/2012 Wu ..................... H04L 63/0884
713/168
8,572,395 B2 10/2013 Ito
(Continued)

FOREIGN PATENT DOCUMENTS

CN 1971574 5/2007
CN 101431594 A 5/2009
(Continued)

OTHER PUBLICATIONS

Office Action dated Jan. 13, 2015, by the Japan Patent Office in corresponding Japanese Patent Application No. 2013-061731, and an English Translation of the Office Action. (11 pages.).
(Continued)

*Primary Examiner* — John B King
(74) *Attorney, Agent, or Firm* — Buchanan Ingersoll & Rooney PC

(57) ABSTRACT

An authenticating system comprises an information processing device and an authentication server connected over a network. The information processing device includes: a storage part for storing user registration information with which the identification information of each user and authentication information other than a password are registered; an authentication information acquiring part for acquiring the authentication information based on receiving a user's instruction; an identification information acquiring part for acquiring the identification information corresponding to the authentication information by running a search through the user registration information; an authentication requesting part for generating the authentication request including the identification information and sending the generated authentication request to the authentication server; a receiving part for receiving the result of the authentication from the authentication server; and a controlling part for putting the information processing device into
(Continued)

a logged-in state in accordance with the result of the authentication.

28 Claims, 10 Drawing Sheets

(56) References Cited

U.S. PATENT DOCUMENTS

| | | | |
|---|---|---|---|
| 2003/0074568 A1* | 4/2003 | Kinsella | G06F 21/32 |
| | | | 713/186 |
| 2003/0191949 A1 | 10/2003 | Odagawa | |
| 2003/0208697 A1* | 11/2003 | Gardner | G06Q 20/385 |
| | | | 713/184 |
| 2009/0235068 A1* | 9/2009 | Song | H04L 9/3263 |
| | | | 713/156 |
| 2012/0216262 A1* | 8/2012 | Bardsley | H04L 63/0861 |
| | | | 726/5 |

FOREIGN PATENT DOCUMENTS

| | | |
|---|---|---|
| JP | 10-161979 A | 6/1998 |
| JP | 2002-149611 A | 5/2002 |
| JP | 2002-351444 A | 12/2002 |
| JP | 2002-366526 A | 12/2002 |
| JP | 2003-058204 A | 2/2003 |
| JP | 2006-209573 A | 8/2006 |
| JP | 2007-122417 A | 5/2007 |
| JP | 2007-128323 A | 5/2007 |
| JP | 2008-123335 A | 5/2008 |
| JP | 2009-116659 A | 5/2009 |
| JP | 2012-084085 A | 4/2012 |

OTHER PUBLICATIONS

Chinese Office Action ("The Second Office Action") dated Jun. 13, 2017, by the Chinese Patent Office in corresponding Chinese Patent Application No. 201410106594.4 and English translation of the Office Action (16 pages).

* cited by examiner

FIG. 3A

AUTHENTICATION REGISTRATION INFORMATION  34

| USER ID (34a) | PASSWORD (34b) | AUTHORITY INFORMATION (34c) | BILLING INFORMATION (34d) |
|---|---|---|---|
| 13295 | ******** | Color Print : YES<br>Staple : NO<br>⋮ | ¥1260 |
| 27496 | ******** | Color Print : YES<br>Staple : YES<br>⋮ | ¥620 |
| 48762 | ******** | Color Print : NO<br>Staple : NO<br>⋮ | ¥4350 |

FIG. 3B

USER REGISTRATION INFORMATION  17

| USER ID (17a) | AUTHENTICATION INFORMATION (17b) ||
|---|---|---|
| | CARD INFORMATION | BIOLOGICAL INFORMATION |
| 13295 | 1001011001⋯ | 10010011001⋯ |
| 27496 | 1111011001⋯ | 10101000001⋯ |
| 48762 | 1000011111⋯ | 10000010001⋯ |

AUTHENTICATING SYSTEM, INFORMATION PROCESSING DEVICE, AUTHENTICATING METHOD AND NON-TRANSITORY COMPUTER READABLE RECORDING MEDIUM

This application is based on the application No. 2013-061731 filed in Japan, the contents of which are hereby incorporated by reference.

BACKGROUND OF THE INVENTION

Field of the Invention

The present invention relates to an authenticating system, an information processing device, an authenticating method and a non-transitory computer readable recording medium. The present invention more specifically relates to a technique of authenticating a user who uses the information processing device.

Description of the Background Art

In the conventional environment where multiple management devices share contents, the devices send and receive the contents. In such a case, the contents are sent and received with a temporal ID not the one used in the device. With the temporal ID, the ID used in the device is kept being confidential. This known technique is introduced for example in Japanese Patent Application Laid-Open No. JP 2012-84085 A.

Some information processing devices called as MFPs (Multi-Function Peripherals) installed in an office environment, for instance, authenticate users who use the information processing devices in the light of security. Especially in many office environments, more than one information processing device are connected to a network. The users who use the respective information processing devices are managed in an integrated manner. An authentication server, therefore, is installed in a network environment, and the conventional user authentication of the users who use the respective information processing devices is generally performed on the authentication server.

With the popularization of recent cloud computing, it is considered to install the authentication server conventionally installed in the on-premise environment on the public cloud such as an internet. More specifically, if the authentication server is installed on the cloud, user authentication of all users who use each information processing device installed at each business office may be performed on the authentication server on the cloud. As a result, initial installation costs may be reduced compared to that for installation of the authentication server in every business office.

Conventional user authentication of the user who uses the information processing device is performed based on a user ID and a password input by the user through an operational panel. It, however, is bothersome for the user to input the user ID and the password through the operational panel by manual. In recent years, some user authentications are performed by reading card information from an IC card carried by the user, or by reading biological information such as fingerprint pattern or vein pattern showing personal feature of the user. These types of authenticating methods do not require the users to input information such as character strings by operating the operational panel by manual, resulting in good operability.

For the user authentication on the authentication server on the cloud, basic information that should be cross-checked at the user authentication needs to be registered in advance with the authentication server. More specifically, the basic information may be the user ID, the password, the card information and/or the biological information relating to the registered user. If, however, such information is stored on the authentication server installed on the cloud, security problem like leakage of information occurs.

The password consists of character strings may be changed by the user at any time. Even if the password is leaked out from the authentication server on the cloud, the user changes the password to the new one so that unauthorized use of the password may be prevented. The card information recorded on the IC card and the biological information showing the personal feature of the user cannot be changed easily. Especially the biological information is something that can never be changed. Therefore, once the card information or the biological information is leaked out from the authentication server installed on the cloud, prevention of unauthorized use of the leaked card information or biological information is not easy.

SUMMARY OF THE INVENTION

The present invention is intended to solve the above problems. Thus, the present invention is intended to provide an authenticating system, an information processing device, an authenticating method and a non-transitory computer readable recording medium capable of preventing leakage of authentication information including card information, biological information and so on from occurring from an authentication server installed on a network.

First, the present invention is directed to an authenticating system comprising an information processing device and an authentication server connected over a network. The information processing device sends an authentication request to the authentication server. The authentication server performs user authentication based on the authentication request. The information processing device controls an operation state in accordance with a result of the user authentication.

According to an aspect of the authenticating system, the authentication server includes: a first storage part for storing authentication registration information with which identification information used for identification of a user and a password consisting of a character string are registered, the identification information and the password being recorded in association with each other; and an authentication determining part for authenticating the user by determining whether or not information included in the authentication request from the information processing device is registered with the authentication registration information. The information processing device includes: a second storage part for storing user registration information with which the identification information of each user and authentication information other than the password are registered, the identification information and the authentication information being recorded in advance in association with each other; an authentication information acquiring part for acquiring the authentication information based on receiving a user's instruction; an identification information acquiring part for acquiring the identification information corresponding to the authentication information by running a search through the user registration information after the authentication information is acquired by the authentication information acquiring part; an authentication requesting part for generating the authentication request including the identification information acquired by the identification information acquiring part and sending the generated authentication request to the authentication server; a receiving part for receiving the result of the authentication from the authentication server based on the authentication request which is sent by the authentication requesting part; and a controlling part for putting the information processing device into a logged-in state in accordance with the result of the authentication received by the receiving part.

Second, the present invention is directed to an information processing device sending an authentication request to an authentication server which manages identification information of each user and a password consists of a character string by associating them with each other, and controlling its operation state in accordance with a result of user authentication performed by the authentication server According to one aspect of the information processing device, the information processing device comprises: a storage part for storing user registration information with which the identification information of each user and authentication information other than the password are registered, the identification information and the authentication information being recorded in advance in association with each other; an authentication information acquiring part for acquiring the authentication information based on receiving a user's instruction; an identification information acquiring part for acquiring the identification information corresponding to the authentication information by running a search through the user registration information after the authentication information is acquired by the authentication information acquiring part; an authentication requesting part for generating the authentication request including the identification information acquired by the identification information acquiring part and sending the generated authentication request to the authentication server; a receiving part for receiving the result of the authentication from the authentication server based on the authentication request which is sent by the authentication requesting part; and a controlling part for putting the operation state into a logged-in state in accordance with the result of the authentication received by the receiving part.

Third, the present invention is directed to an authenticating method of causing an information processing device sending an authentication request to an authentication server and the authentication server performing user authentication based on the authentication request, thereby controlling an operation state of the information processing device in accordance with a result of the user authentication, in a network that the information processing device and the authentication server connected each other.

According to one aspect of the authenticating method, the authenticating method comprises the steps of; (a) registering authentication registration information with which identification information used for identification of a user and a password consists of a character string are registered with the authentication server, the identification information and the password being recorded in association with each other; (b) registering user registration information with which the identification information of each user and authentication information other than the password are registered with the information processing device, the identification information and the authentication information being recorded in association with each other; (c) acquiring the authentication information on the information processing device based on receiving a user's instruction; (d) acquiring the identification information corresponding to the authentication information by running a search through the user registration information after the authentication information is acquired by the information processing device; (e) generating the authentication request including the identification information and sending the generated authentication request to the authentication server when the identification information corresponding to the authentication information is acquired by the information processing device; (f) authenticating the user by determining whether or not information included in the authentication request is registered with the authentication registration information after the authentication request is received by the authentication server from the information processing device; (g) receiving the result of the user authentication sent from the authentication server on the information processing device; and (h) putting an operation state of the information processing device into a logged-in state in accordance with the result of the user authentication received on the information processing device.

Forth, the present invention is directed to a non-transitory computer readable recording medium on which a program is recorded. The program is executable on an information processing device capable of establishing communication with an authentication server which manages identification information of each user and a password consists of a character string by associating them with each other.

According to an aspect of the non-transitory computer readable recording medium, the program causes the information processing device to execute the steps of: (a) generating user registration information with which the identification information of each user and authentication information other than the password are registered and storing the generated user registration information in a predetermined storage part, the identification information and the authentication information being recorded in association with each other; (b) acquiring the authentication information based on receiving a user's instruction; (c) acquiring the identification information corresponding to the authentication information by running a search through the user registration information after the authentication information is acquired based on receiving the user's instruction; (d) generating an authentication request including the identification information and sending the generated authentication request to the authentication server after the identification information corresponding to the authentication information is acquired; and (e) receiving a result of the authentication from the authentication server after sending the authentication request; and (f) putting an operation state into a logged-in state in accordance with the received result of the authentication.

BRIEF DESCRIPTION OF THE DRAWINGS

FIGS. 3A and 3B are examples of authentication registration information and user registration information;

DESCRIPTION OF THE PRESENT PREFERRED EMBODIMENTS

Figure 1:
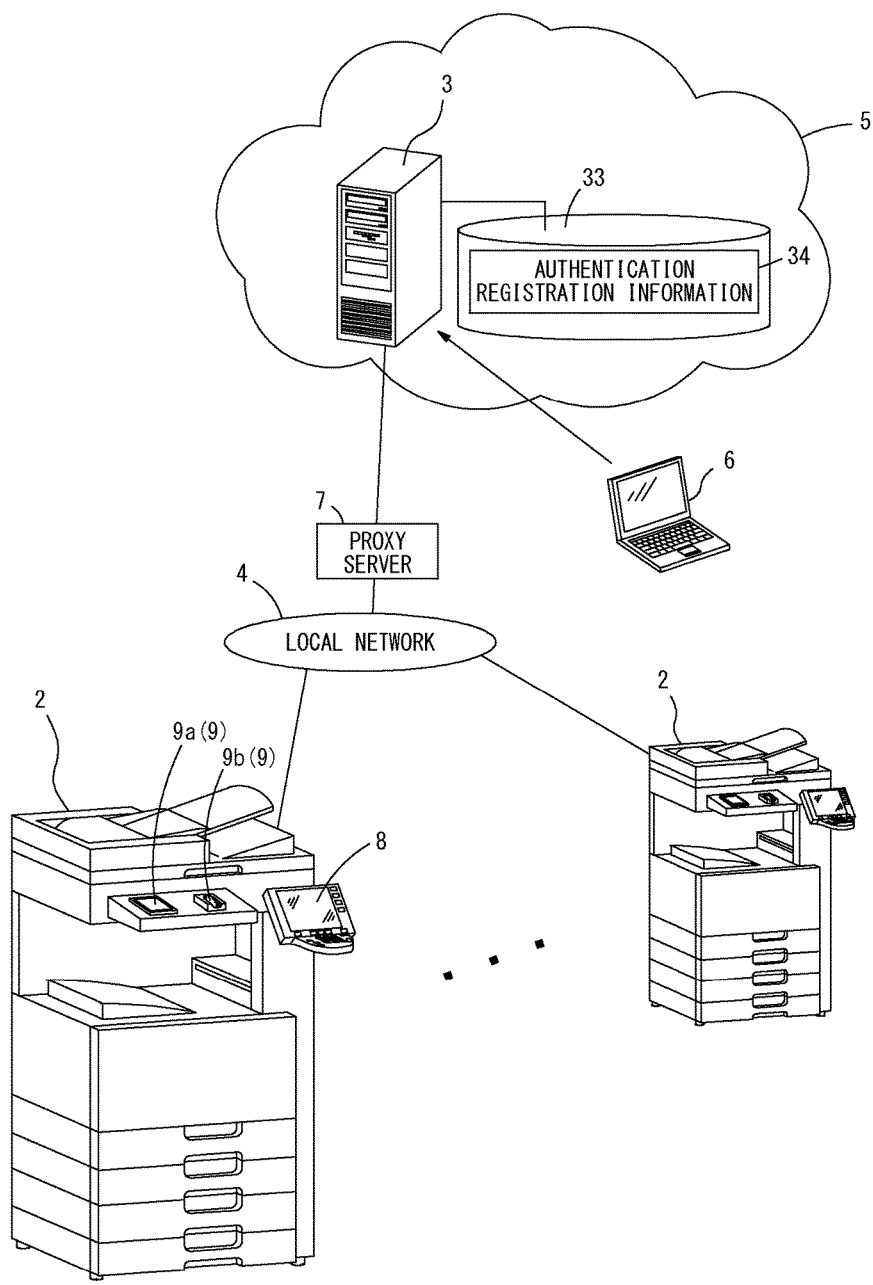
FIG. 1 shows an exemplary configuration of an authenticating system of a first preferred embodiment.

Preferred embodiments of the present invention are described in detail below with reference to figures. In the description given below, those elements which are shared in common among figures are represented by the same reference numerals, and these elements are not discussed repeatedly for the same description.

First Preferred Embodiment

FIG. 1 shows an exemplary configuration of an authenticating system 1 of the first preferred embodiment. The authenticating system 1 comprises multiple information processing devices 2 that are connected to a local network 4 established in an on-premises environment such as a corporate LAN, for instance. These information processing devices 2 are formed from devices such as MFPs and include more than one function including copy function, scan function, print function and FAX function. The information processing devices 2 are capable of sending and receiving various types of data besides document data and image data over the local network 4. A proxy server 7 is also connected to the local network 4. The local network 4 is connected to public external network such as an internet via the proxy server 7. The external network, cloud 5 has an authentication server 3. On the authentication server 3, authentication to authenticate a user who uses each information processing device 2 is performed in cooperation with the information processing device 2. Each information processing device 2 establishes communication with the authentication server 3 over the local network 4 via the proxy server 7, thereby sending a request for authentication to the authentication server 3. After receiving an authentication result from the authentication server 3, the information processing device 2 determines whether or not to grant use by the user.

In the example of FIG. 1, only one local network 4 is connected to the authentication server 3. The number of the local network 4 connected to the authentication server 3 does not have to be only one, and it may be more than one. More specifically, more than one local network 4 established in each business office may be connected to the authentication server 3. In such a case, the authentication server 3 performs user authentication in response to the authentication request received from the information processing device 2 connected to each of the local networks 4. The authentication server 3, therefore, is capable of performing user authentication of all users who use the respective information processing devices 2 installed in each business office.

The information processing device 2 includes an operational panel 8, a user interface operable by the user in use of the information processing device 2 as illustrated in FIG. 1. The user operates the operational panel 8, thereby inputting character strings such as a user ID and a password required for user authentication by manual. Once the information processing device 2 is put into a logged-in state after user authentication results in success, the user is allowed to configure job settings or make a variety of inputs such as inputs of job executing instructions through the operational panel 8.

The information processing device 2 includes an authentication information acquisition device 9 that acquires authentication information except for the user ID and the password. The information processing device 2 of the first preferred embodiment has two devices, a card reader 9a and a biological information reading device 9b as the authentication information acquisition device 9. The card reader 9a reads recorded information (card information) recorded on a recording medium from a portable IC card (portable recording medium) which has the internal computer readable recording medium owned by the user within it, thereby acquiring the user-specific authentication information. The biological information reading device 9b reads, for instance, a fingerprint pattern or a vein pattern which is one of personal features as the biological information, thereby acquiring the biological information as the user-specific authentication information. The biological information acquired by the biological information reading device 9b is not always the fingerprint pattern or the vein pattern. It may be another kind of biological information, for example, voiceprint, iris or face image.

For using the information processing device 2, the user makes inputs through the operational panel 8 to input the user ID and the password, consist of character strings, by manual, and give an instruction to start user authentication to the information processing device 2. The character strings consist of equal to or more than a predetermined number of letters. If the user feels bothersome to input the information through the operational panel 8 by manual, he or she may place the IC card carried with him or her on a reading position of the card reader 9a or put his or her finger tip on a reading position of the biological information reading device 9b, thereby making the authentication information acquisition device 9 automatically acquire the authentication information. The user then allowed giving the instruction to start user authentication to the information processing device 2.

After starting a process for user authentication in response to the user's instruction, the information processing device 2 sends the authentication request to the authentication server 3. When the authentication result received from the authentication server 3 shows that the authentication results in success, the information processing device 2 switches its operation state to a logged-in state in which the user is logged-in. The user is then allowed to give instructions as to execution of various types of jobs like copy jobs with the information processing device 2. When the authentication result shows that the authentication results in failure, the information processing device 2 does not switch its operation state to the logged-in state and keeps the logged-out state. So, the user who is not successfully authenticated is not allowed to use the information processing device 2.

The authentication server 3 includes a storage device 33 formed from a hard disk drive (HDD). The storage device 33 stores therein in advance authentication registration information 34. The authentication registration information 34 is basic information used at user authentication for cross-checking information included in the authentication request received from the information processing device 2, and is registered in advance with the authentication server 3. An administrator responsible for managing the multiple information processing devices 2 uses, for instance, a computer 6 to access the authentication server 3 as illustrated in FIG. 1 and register the basic information with the authentication server 3 through the computer 6, thereby registering the authentication registration information 34. Also, the individual user who uses the information processing device 2 may use the computer 6 to register the information with the authentication server 3 by him/herself, thereby registering his or her information as the authentication registration information 34 or modifying the authentication registration information 34 already registered. With the authentication registration information 34 registered with the authentication server 3, the authentication server 3 is capable of performing user authentication based on the information included in the authentication request received from the information processing device 2.

Figure 2:
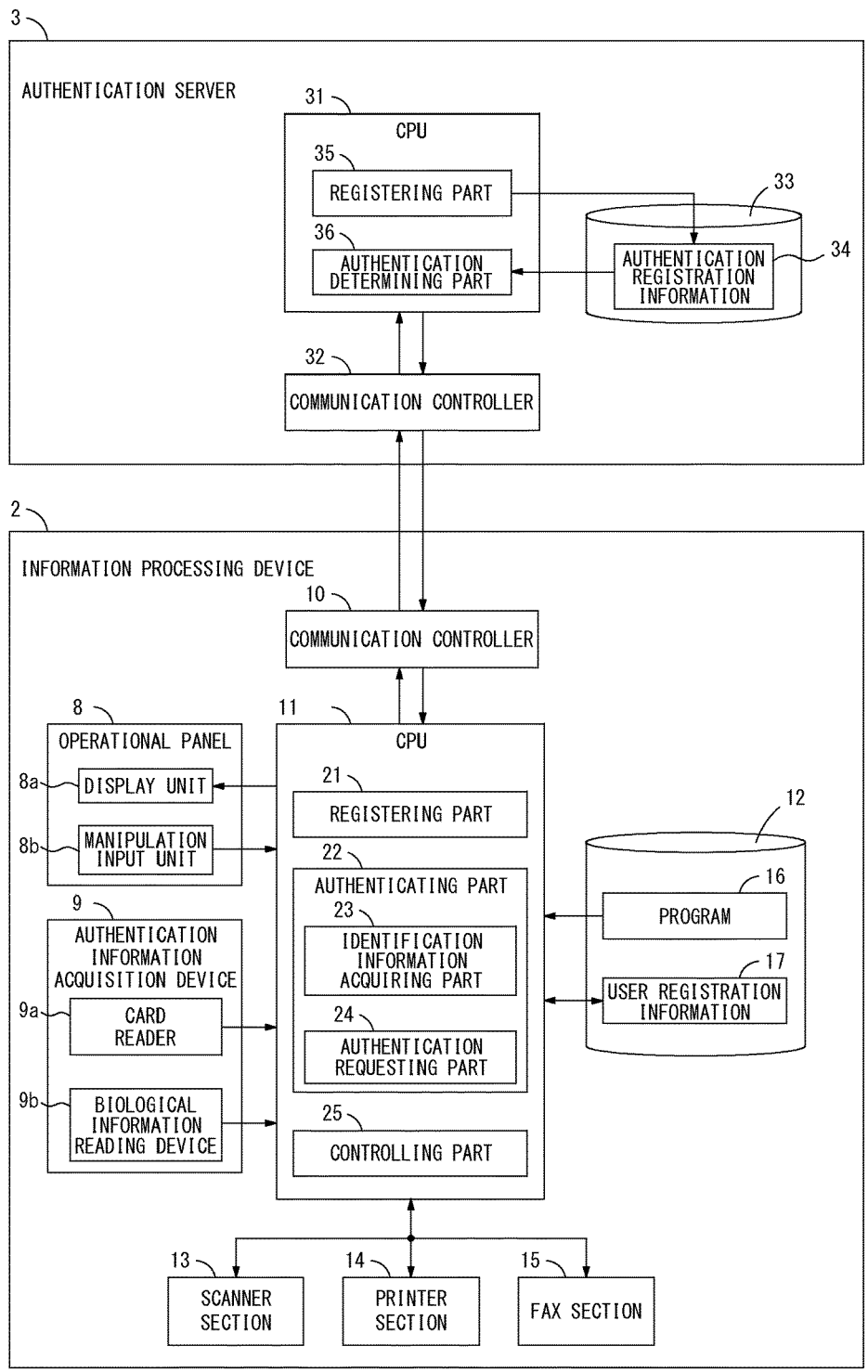
FIG. 2 is a block diagram showing an exemplary hardware configuration and functional configuration of an authentication server and an information processing device comprised in the authenticating system of the first preferred embodiment.

FIG. 2 is a block diagram showing an exemplary hardware configuration and functional configuration of the authentication server 3 and the information processing device 2 comprised in the authenticating system 1 of the first preferred embodiment. The authentication server 3 includes a CPU 31, a communication controller 32 and the aforementioned storage device 33. The CPU 31 executes a predetermined program, thereby serving as a registering part 35 and an authentication determining part 36. The communication controller 32 establishes communication with the information processing device 2 over the network.

The registering part 35 is a part which registers the authentication registration information 34 with the storage device 33 or updates the registered authentication registration information 34. The registering part 35 is brought into operation in response to receiving an access from the computer 6, for example. Once the registering part 35 is brought into operation, it newly registers the information of each user as the authentication registration information 34 and/or updates the registered authentication registration information 34.

FIG. 3A is an example of the authentication registration information 34 registered by the registering part 35. As illustrated in FIG. 3A, the authentication registration information 34 consists of several types of information as the information about each user, a user ID 34a, a password 34b, authority information 34c and billing information 34d. The user ID 34a is identification information used for identifying each user who uses the information processing device 2, and is a character string consists of at least one alphabet and/or number, for example. The user ID 34 is inherent information of individual user. The user ID 34 is unique information, for instance, given to each user by the administrator, and the user is not allowed to change by him/her at will. The password 34b is one kind of authentication information used for authenticating the user corresponding to the user ID. The password 34b is a character string which mixes equal to or more than a predetermine number of alphabets and/or numbers, for example, and is set for each user. This password 34b is assigned randomly by the administrator, for instance, but the user is allowed to change by him/her at will. The authority information 34c is an information defining a use authority to use the information processing device 2 for each user. The authority information 34c shows settings as to availability of color print or staple, for example. This authority information 34c is set individually for each user by the administrator, for instance, and the user is not allowed to change by him/her at will. The billing information 34d shows a billing amount that should be charged each user for using the information processing device 2. The billing information 34d is updated every time the user uses the information processing device 2 to execute the job, for example. The user is not allowed to change the billing information 34d by him/her at will. When the job is executed on the information processing device 2 in which the user who is successfully authenticated is logging, the registering part 35 updates the billing information 34d of the user who is successfully authenticated based on the executed job.

The authentication determining part 36 performs user authentication of the user who uses each information processing device 2. The authentication determining part 36 is brought into operation when the communication controller 32 receives the authentication request, and cross-checks the information to see whether or not any information matches the information included in the authentication request is registered as the authentication registration information 34, thereby authenticating the user. If, for example, the authentication request received by the communication controller 32 includes both of the user ID and the password, the authentication determining part 36 determines whether or not the information matches both of the user ID and the password is registered as the authentication registration information 34, and authenticating the user. The authentication request received by the communication controller 32 may include only the user ID, which is the identification information of the user. In such a case, the authentication determining part 36 determines whether or not the information matches the user ID is registered as the authentication registration information 34, thereby authenticating the user.

It is assumed, for example, the user who uses the information processing device 2 is one of the registered users registered with the authentication registration information 34, and the user is successfully authenticated. In this case, the authentication determining part 36 sends the authority information 34c set for the authenticated user to the information processing device 2. In response to receiving the information, the information processing device 2 switches its operation state to the logged-in state in which the successfully authenticated user is logging from the logged-out state. The information processing device 2 then activates the function available for the user of the multiple functions including copy function, scan function, print function, and FAX function based on the authority information 34c received from the authentication server 3 to become ready for execution of the job.

As described above, the authenticating system 1 of the first preferred embodiment comprises the authentication server 3 installed on the cloud 5 stores therein the authentication registration information 34 which includes the authority information 34c registered in advance for each user. With the authority information 34c registered in advance, the use authority set in advance by the administrator may be applied to use of the information processing device 2 by the user whichever information processing device 2 at any business office is used by the user. As a result, on the authenticating system 1, the use authority of each user may be managed in an integrated manner on the authentication server 3. Also, on the authenticating system 1, the billing information 34d showing the amount that should be charged each user may be managed in the integrated manner on the authentication server 3. The administrator, therefore, is allowed to easily manage the information such as the use authority and use history of the user who uses the information processing device 2.

The information processing device 2 includes the operational panel 8, the authentication information acquisition device 9, a communication controller 10, a CPU 11, a storage device 12, a scanner section 13, a printer section 14 and a FAX section 15.

The operational panel 8, a user interface operable by the user in use of the information processing device 2 as described above includes a display unit 8a and a manipulation input unit 8b. The display unit 8a on which various types of information is displayed to the user is formed from a device such as a color liquid crystal display, for example. The user uses the manipulation input unit 8b to input the information. The manipulation input unit 8b formed with parts such as touch panel sensors (soft keys) arranged on the screen of the display unit 8a and push-button keys (hard keys) arranged around the screen of the display unit 8a, for example.

The authentication information acquisition device 9 includes the card reader 9a and the biological information reading device 9b as described above.

The communication controller 10 connects the information processing device 2 with the local network 4. The information processing device 2 establishes communication with the authentication server 3 via the communication controller 10.

The CPU 11 is a central processing unit that controls overall operations of each part of the information processing device 2. After the information processing device 2 is powered on, the CPU 11 reads and runs a program 16 installed in advance on the storage device 12, and executes the variety of processing defined by the program 16. The CPU 11 runs the program 16, thereby serving as various types of processing parts. Especially in the first preferred embodiment, the CPU 11 runs the program 16, thereby serving as a registering part 21, an authenticating part 22 and a controlling part 25.

The storage device 12 is formed from a nonvolatile storage device such as a hard disk drive (HDD), for instance. The storage device 12 stores therein in advance user registration information 17 besides the aforementioned program 16.

The scanner section 13 reads a document to generate image data in response to receiving the user's instruction when the information processing device 2 is logged in by the user. The printer section 14 forms images on a printing medium such as a printing sheet to produce a printed output based on image data received over the local network 4 or image data specified by the user. The FAX section 15 sends and receives FAX data over public phone lines which are not shown in figures.

Next, the registering part 21, the authenticating part 22 and the controlling part 25 brought into operation on the CPU 11 are described.

The registering part 21 associates the authentication information that is specified to be confidential with the user ID of each user, and registers the user ID and the corresponding authentication information with the user registration information 17 stored on the storage device 12 in response to receiving the instruction by the administrator or the individual user.

FIG. 3B is an example of the user registration information 17 registered by the registering part 21. By referring to FIG. 3B, the card information and the biological information which are the authentication information different from the password is specified as the authentication information that should be confidential. A user ID 17a and authentication information 17b except for the password are recorded for each user as the user registration information 17 of FIG. 3B. The user ID 17a is identification information used for identifying the individual user, and has a consistency with the user ID 34a registered with the authentication registration information 34 on the authentication server 3. The user registration information 17 includes the authentication information 17b except for the password. As the authentication information 17b, either or both of the card information recorded on the IC card carried by each user and/or the biological information of the user is recorded. The authentication information 17b that should be confidential is associated with the user ID 17a, and the user ID 17a and the corresponding authentication information 17b are registered in advance. When acquiring the card information or the biological information through the authentication information acquisition device 9, the information processing device 2 cross-checks the user registration information 17, thereby identifying the user ID corresponds to the acquired card information or biological information.

The authenticating part 22 sends the authentication request to the authentication server 3 in response to receiving the instruction by the user who uses the information processing device 2, and determines whether or not the user who uses the information processing device 2 is the registered user registered with the authentication server 3 based on the result of user authentication performed by the authentication server 3. The authenticating part 22 includes an identification information acquiring part 23 and an authentication requesting part 24 as shown in FIG. 2.

The identification information acquiring part 23 is brought into operation when the authentication information acquisition device 9 acquires the card information or the biological information as the authentication information in response to receiving the instruction by the user who uses the information processing device 2. The identification information acquiring part 23 runs a search through the user registration information 17 based on the authentication information acquired by the authentication information acquisition device 9, thereby acquiring the user ID (identification information) corresponding to the authentication information. To be more specific, when the authentication information such as the card information or the biological information except for the password, that is specified to be confidential, is acquired, the identification information acquiring part 23 converts the authentication information to the user ID. If the user inputs the user ID and the password by manual through the operational panel 8, the identification information acquiring part 23 does not convert the information to the user ID.

The authentication requesting part 24 generates the authentication request to send to the authentication server 3 and sends the generated authentication request to the authentication server 3 via the communication controller 10. When the identification information acquiring part 23 converts the authentication information such as the card information and/or the biological information to the user ID, the authentication requesting part 24 generates the authentication request including only the user ID. When the user inputs the user ID and the password through the operational panel 8 by manual, the authentication requesting part 24 generates the authentication request including both the user ID and the password. After sending the authentication request to the authentication server 3, the authentication requesting part 24 is put into a standby state until receiving the result of user authentication on the authentication server 3. In response to receiving the result of user authentication, the authentication requesting part 24 determines whether the user authentication results in success or failure. When the user authentication results in success, the authentication requesting part 24 puts the controlling part 25 into operation.

It is assumed that the user authentication results in success and the user who is using the information processing device 2 is identified as the registered user. In this case, the controlling part 25 switches the operation state of the information processing device 2 to the logged-in state from the logged-out state. More specifically, the controlling part 25 switches to the logged-in state in which the user successfully authenticated with user authentication is logging and all the functions the user is granted to use have made available for the user based on the authority information 34c received from the authentication server 3. Once the information processing device 2 enters the logged-in state, the user is allowed to select any function available for him or her and use the selected function. After putting the information processing device 2 into the logged-in state, the controlling part 25 applies the settings relating to the job to the parts such as the scanner section 13 and/or the printer section 14 based on the settings configured by the user. Also, by bringing the parts such as the scanner section 13 and/or the printer section 14 into operation in response to the instruction on execution of the job by the user, the controlling part 25 controls execution of the job.

Figure 4:
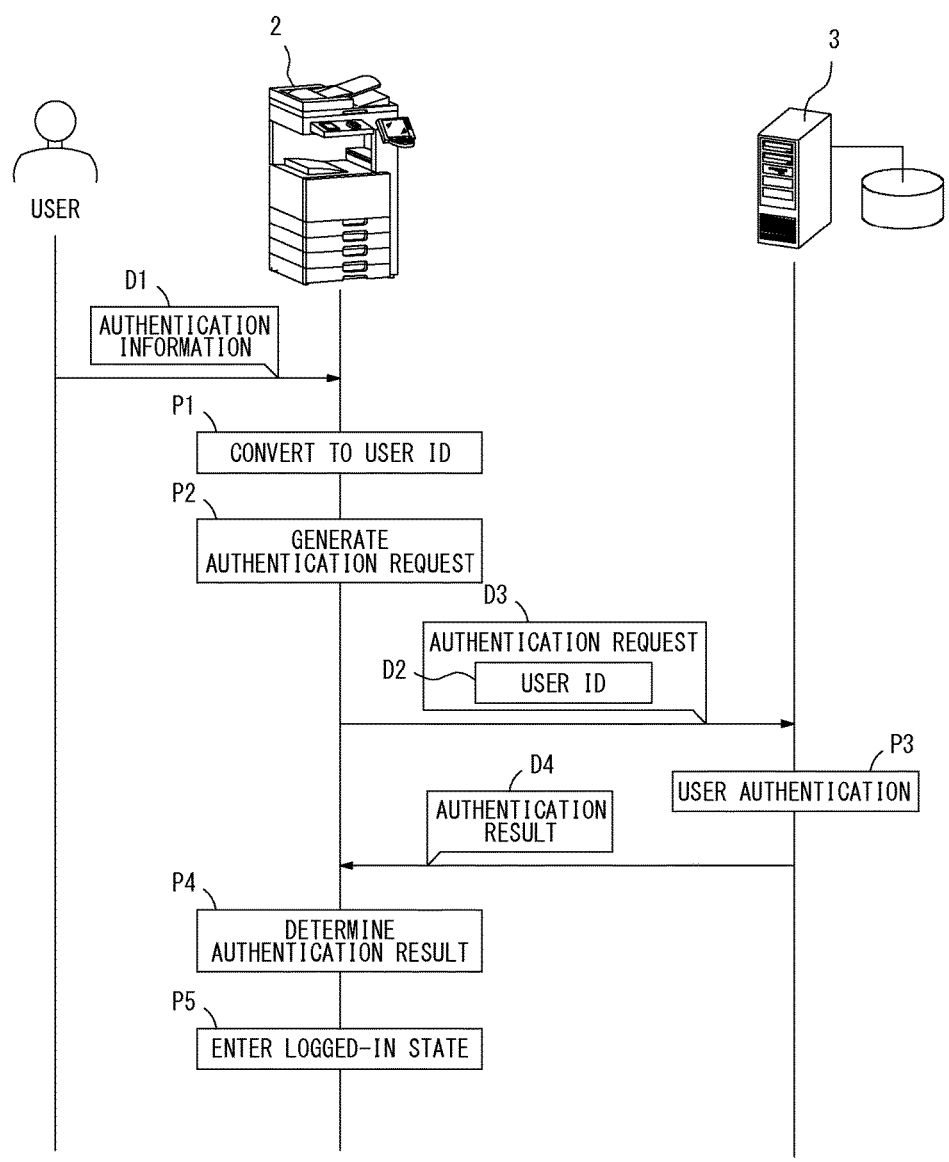
FIG. 4 is an example of a process of user authentication of a user using the information processing device on the authenticating system.

FIG. 4 is an example of a process of user authentication of the user using the information processing device 2 on the authenticating system 1 having the aforementioned configuration. In the example of FIG. 4, the user gives the instruction to start user authentication with the card information or the biological information. The user using the information processing device 2 gives the instruction to start user authentication to the information processing device 2 by placing his or her IC card on the reading position of the card reader 9a or by putting his or her finger tip on the reading position of the biological information reading device 9b. In response to receiving the instruction, the information processing device 2 reads and acquires authentication information D1 such as the card information or the biological information. After acquiring the authentication information D1, the information processing device 2 refers to the user registration information 17 and acquires the user ID as identification information D2 of the user corresponding to the authentication information D1, thereby converting the authentication information D1 to the identification information D2 (process P1). The information processing device 2 then generates an authentication request D3 including only the identification information D2 (process P2), and sends the generated authentication request D3 to the authentication server 3. To be more specific, the authentication request D3 sent to the authentication server 3 by the information processing device 2 does not include any authentication information D1 such as the card information and/or the biological information that cannot be easily changed.

For sending the authentication request D3, the information processing device 2 may send a one-time password randomly created in accordance with a rule set in advance with the authentication server 3 with the authentication request D3 as an attachment. This one-time password may be used for authentication on the authentication server 3. Therefore, even when receiving the authentication request D3 not including the authentication information D1 such as the card information and/or the biological information, the authentication server 3 performs authentication with the received one-time password, thereby determining if the authentication request D3 is sent from the proper information processing device 2.

Moreover, for sending the authentication request D3 to the authentication server 3, the information processing device 2 may encrypt the authentication request D3 with an encryption key shared with the authentication server 3 and send the encrypted authentication request D3. In this case, the authentication server 3 is allowed to decrypt the encrypted authentication request D3 with a predetermined decryption key. Even when the authentication server 3 receives the authentication request D3 not including the authentication information D1 such as the card information and/or the biological information, it may determine that the request is sent from the proper information processing device 2 if it may normally decrypt the encrypted authentication request D3.

In response to receiving the authentication request D3 including only the identification information D2, the authentication server 3 determines whether or not any information marches the included identification information D2 is registered with the authentication registration information 34, thereby performing user authentication (process P3). If the user ID matches the identification information D2 is registered with the authentication registration information 34, the authentication results in success. In this case, the authority information 34c corresponding to the user ID is sent to the information processing device 2 together with an authentication result D4. If the user ID matches the identification information D2 is not registered with the authentication registration information 34, the authentication results in failure. In this case, the authentication result D4 showing that the authentication results in failure is sent to the information processing device 2.

In response to receiving the authentication result D4 from the authentication server 3 as a response to the authentication request, the information processing device 2 distinguishes the authentication result D4 and determines whether or not the user using the information processing device 2 is the registered user (process P4). When the authentication result D4 shows that the authentication results in success, the information processing device 2 enters the logged-in state in which the user who is determined as the registered user is logging (process P5). The user then is allowed to use the information processing device 2 to make the job execute with the information processing device 2.

In the authentication process shown in FIG. 4, the authentication information D1 which cannot be easily changed by the user is not sent to the authentication server 3 on the cloud 5. Therefore, the authenticating system 1 of the first preferred embodiment is capable of preventing leakage of the authentication information D1 such as the card information and/or the biological information from the authentication server 3 installed on the cloud 5.

The procedure of the process performed by each of the authentication server 3 and the information processing device 2 to realize the above-described authentication process is described in detail next.

Figure 5:
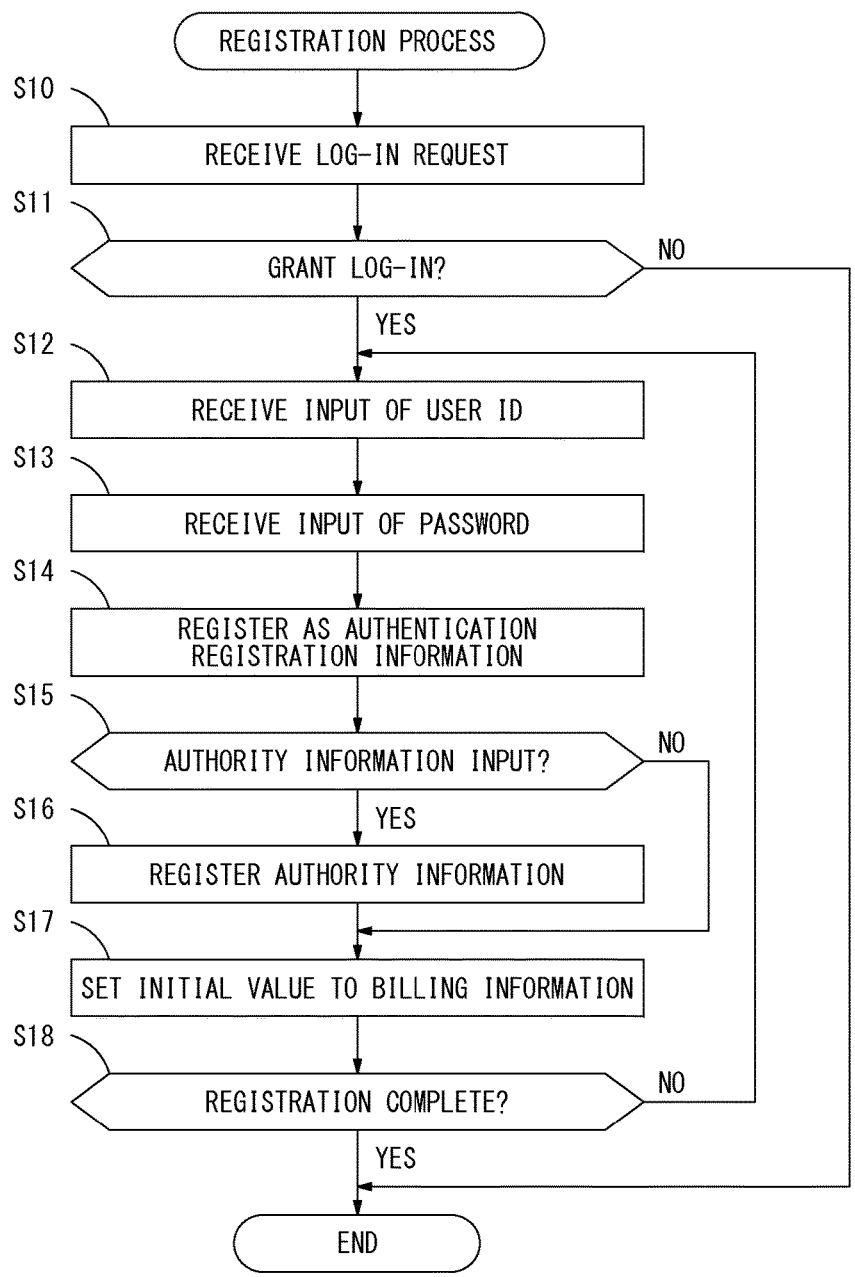
FIG. 5 is a flow diagram explaining an exemplary sequential procedure of the process performed to register in advance the authentication registration information on the authentication server.

FIG. 5 is a flow diagram explaining an exemplary sequential procedure of the process performed to register in advance the authentication registration information 34 on the authentication server 3. This process is mainly performed by the registering part 35 of the authentication server 3. Upon the start, the authentication server 3 receives a log-in request by the administrator from the device such as the computer 6 (step S10), and determines whether or not to grant the log-in (step S11). After granting the log-in (when a result of step S11 is YES), the authentication server 3 receives the input of the user ID which is the identification information of the registered user to register with the authentication registration information 34 (step S12). The authentication server 3 then receives the input of the password that is recorded in association with the user ID (step S13). The authentication server 3 registers the user ID and the corresponding password as the authentication registration information 34 (step S14). The authentication server 3 determines whether or not the authority information 34c is input by the administrator (step S15). After the authority information 34c is input (when a result of step S15 is YES), the authentication server 3 registers the authority information 34c by associating with the user ID and the password, and sets the function restriction on the registered user (step S16). When the authority information 34c is not input by the administrator (when a result of step S15 is NO), the authentication server 3 skips the process in step S16, and the default authority information 34c is automatically set for the registered user. Most narrow range of use is defined by the default authority information 34c automatically set. The authentication server 3 then sets the initial value to the billing information 34d of the registered user who is newly registered with the authentication registration information 34 (step S17). The authentication server 3 determines whether or not the registration operation by the administrator is complete (step S18). When the registration operation is not complete, the authentication server 3 returns to the process in step S12 to repeat the above-described process. When the registration operation is complete, the authentication server 3 completes the process to register the authentication registration information 34.

Figure 6:
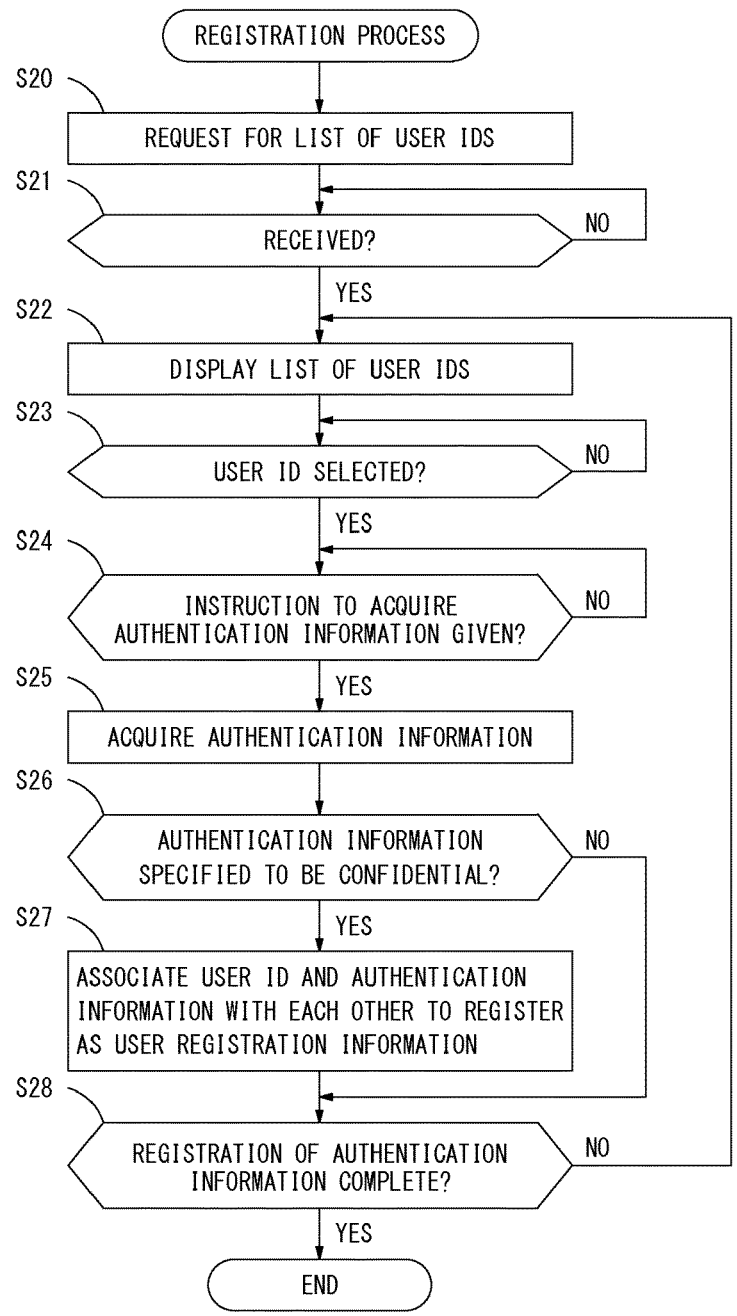
FIG. 6 is a flow diagram explaining an exemplary sequential procedure of the process performed to register in advance the user registration information on the information processing device.
Figure 7:
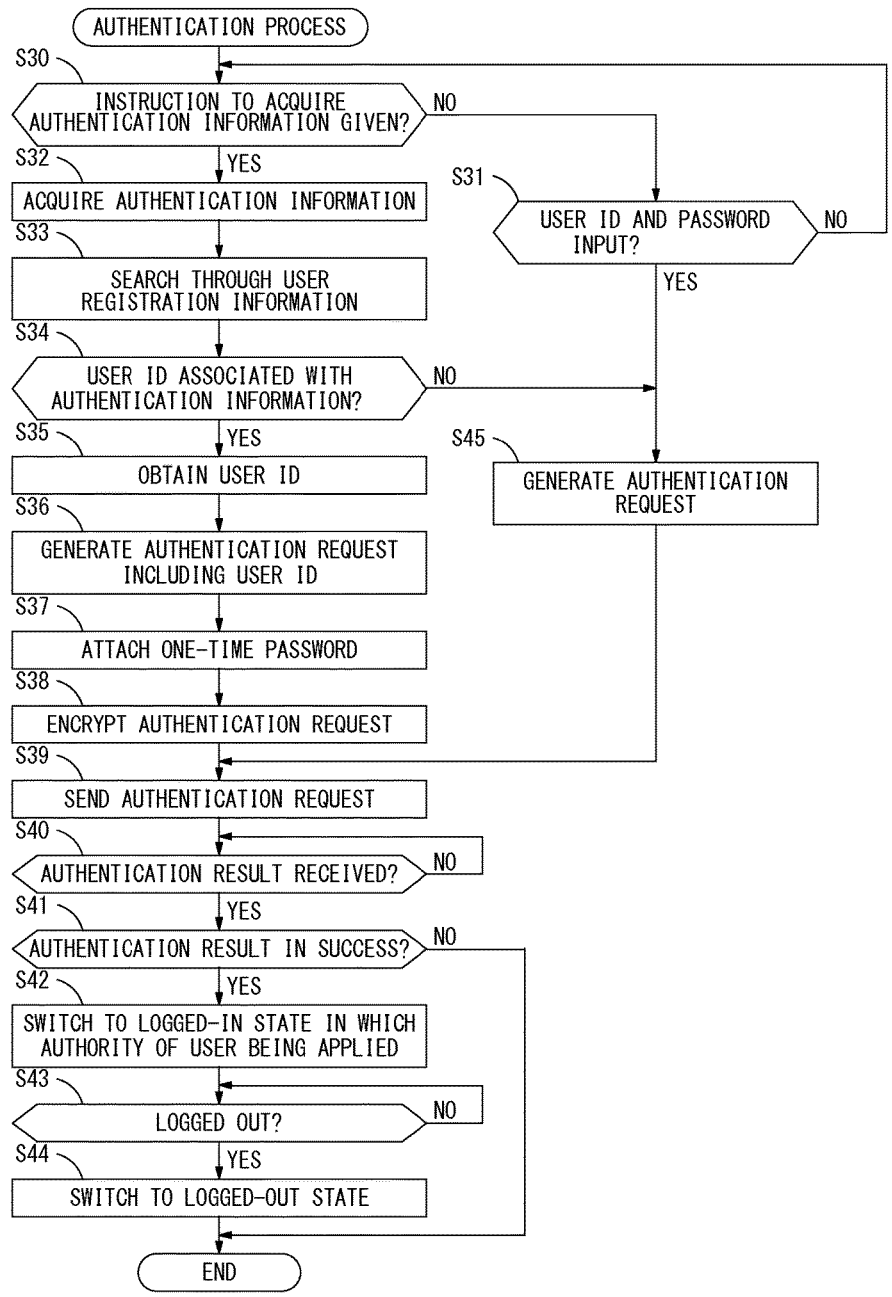
FIG. 7 is a flow diagram explaining an exemplary sequential procedure of the process performed for user authentication on the information processing device.

FIG. 6 is a flow diagram explaining an exemplary sequential procedure of the process performed to register in advance the user registration information 17 on the information processing device 2. This process is mainly performed by the registering part 21 of the information processing device 2. In response to receiving the instruction on registration of the user registration information 17 by the administrator or the individual user, the information processing device 2 starts the process. Upon the start, the information processing device 2 requests for a list of the user IDs to the authentication server 3 (step S20). In response to receiving the request from the information processing device 2, the authentication server 3 generates information including the list of the user IDs registered with the authentication registration information 34 and sends the generated information including the list of the user IDs to the information processing device 2. The information processing device 2 waits until receiving the information including the list (step S21). After receiving the information including the list, the information processing device 2 displays the list of the user IDs registered with the authentication server 3 on the display unit 8a of the operational panel 8 (step S22). The information processing device 2 then waits until one of the user IDs on the displayed list is selected (step S23). After one of the user IDs is selected (when a result of step S23 is YES), the information processing device 2 waits for the instruction to acquire the authentication information (step S24). When the instruction to acquire the authentication information is given as one of the user IDs is selected (when a result of step S24 is YES), the information processing device 2 drives the authentication information acquisition device 9 to acquire the authentication information D1 specified by the user of the card information and the biological information (step S25). Both of the card information and the biological information may be acquired as the authentication information D1. After acquiring the authentication information D1, the information processing device 2 determines whether or not the authentication information D1 is specified to be confidential (step S26). If the authentication information D1 is specified to be confidential (when a result of step S26 is YES), the information processing device 2 associates one of the user IDs being selected and the authentication information D1 acquired with the authentication information acquisition device 9 with each other to register the user ID and the corresponding authentication information D1 as the user registration information 17 (step S27). According to the first preferred embodiment, both the card information and the biological information are specified to be confidential. In this case, the authentication information D1 acquired with the authentication information acquisition device 9 registered as the user registration information 17 by associating with the user ID even when the authentication information D1 is either the card information or the biological information. The information processing device 2 determines whether or not the registration operation by the administrator or the individual user is complete (step S28). When the registration operation is not complete, the information processing device 2 returns to the process in step S22 to repeat the above-described process. When the registration operation is complete, the information processing device 2 completes the process to register the user registration information 17, FIG. 7 is a flow diagram explaining an exemplary sequential procedure of the process performed for user authentication on the information processing device 2. This process is mainly performed by the authenticating part 22 and the controlling part 25 of the information processing device 2. Upon the start, the information processing device 2 determines whether or not the instruction to read the authentication information except for the password is received (step S30). When the instruction to read is not received (when a result of step S30 is NO), the information processing device 2 further determines whether or not the user has input the user ID and the password by manual through the operational panel 8 (step S31). If there is no input of the information by manual (when a result of step S31 is NO), the information processing device 2 returns to the process in step S30 to repeat the above-described process and is put into the standby state.

In response to receiving the instruction to read the authentication information except for the password by the user using the information processing device 2 (when a result of step S30 is YES), the information processing device 2 drives the authentication information acquisition device 9 to acquire the authentication information D1 (step S32). The information processing device 2 then runs a search through the user registration information 17 (step S33) to determine whether or not the user ID associated with the authentication information D1 acquired in step S32 is registered with the user registration information 17 (step S34).

When the user ID associated with the authentication information D1 is registered with the user registration information 17 (when a result of step S34 is YES), the information processing device 2 obtains the user ID from the user registration information 17 (step S35) and generates the authentication request D3 including only the user ID (step S36). The information processing device 2 then creates the one-time password which can be used for authentication on the authentication server 3 and sends the created one-time password with the authentication request D3 as the attachment (step S37). The information processing device 2 encrypts the authentication request D3 with the attachment of the one-time password, in a manner which can be decrypted on the authentication server 3 (step S38).

The information processing device 2 sends the authentication request D3 to the authentication server 3 (step S39), and waits until receiving the authentication result D4 from the authentication server 3 (step S40). In response to receiving the authentication result D4 from the authentication server 3 (when a result of step S40 is YES), the information processing device 2 determines whether or not the authentication results in success (step S41). When the authentication results in failure, the information processing device 2 completes the process without switching the state to the logged-in state. When the authentication results in success (when a result of step S41 is YES), the information processing device 2 switches its operation state to the logged-in state in which the use authority of the user is applied based on the authority information 34c received with the authentication result D4 (step S42). Thus, the logged-in user is granted to use the information processing device 2 within the user's authority set in advance. The user is allowed to configure detailed settings relating to the job that should be executed by operating the operational panel 8 and give the instruction to execute the job to the information processing device 2. After switching its operation state to the logged-in state, the information processing device 2 performs operations based on the instructions given by the logged-in user until the user logs out (step S43). After detecting the instruction to log out (when a result of step S43 is YES), the information processing device 2 switches its operation state to the logged-out state from the logged-in state and completes the authentication processing (step S44). After completing the authentication processing, the information processing device 2 returns step S30 to start the processing again.

As described above, when acquiring the card information or the biological information registered in advance with the user registration information 17 as the authentication information D1, the information processing device 2 is configured to send the request for authentication to the authentication sever 3 by sending only the user ID registered in advance with the user registration information 17. In this case, the information processing device 2 does not send the authentication information D1 to the authentication sever 3.

It may found that, for example, the user ID associated with the authentication information D1 is not registered with the user registration information 17 as a result of determination in step S34 (when a result of step S34 is NO). In such a case, the information processing device 2 generates the authentication request including the authentication information D1 acquired in step S32 (step S45). The information processing device 2 then proceeds to step S39 to send the generated authentication request to the authentication sever 3 and performs the processing in steps S40 to S44 as described above. If the information matching the authentication information D1 instead of the password, for instance, is registered with the authentication registration information 34 on the authentication sever 3, the user authentication performed on the authentication sever 3 results in success.

The user ID and the password may be input by the user by manual through the operational panel 8 during the loop processing in steps S30 and S31 (when a result of step S31 is YES). In this case, the information processing device 2 generates the authentication request including the user ID and the password input by manual (step S45). The information processing device 2 then proceeds to step S39 to send the generated authentication request to the authentication sever 3 and performs the processing in steps S40 to S44 as described above. The authentication sever 3 authenticates the user by determining whether or not the information matching both the user ID and the password included in the authentication request is registered with the authentication registration information 34.

Figure 8:
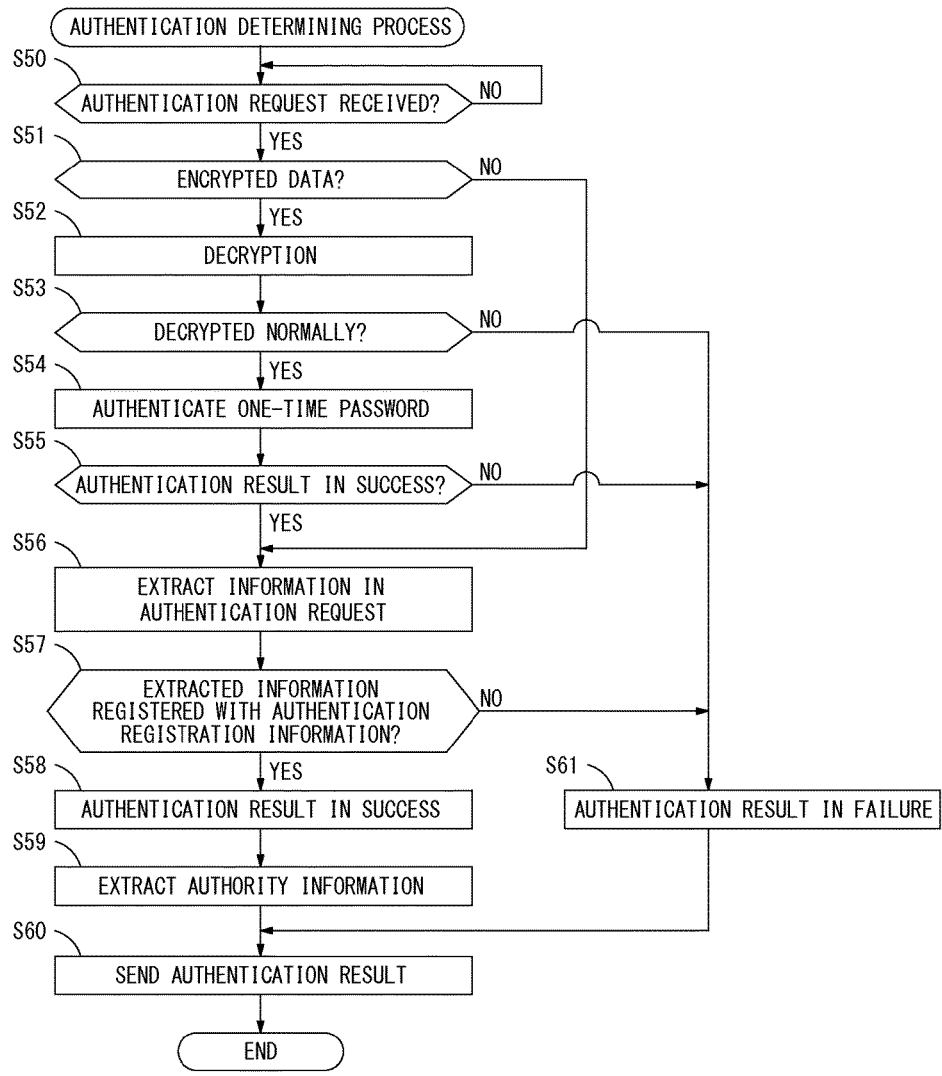
FIG. 8 is a flow diagram explaining an exemplary sequential procedure of the process performed for user authentication on the authentication server.

FIG. 8 is a flow diagram explaining an exemplary sequential procedure of the process performed for user authentication on the authentication sever 3. This process is mainly performed by the authentication determining part 36 of the authentication sever 3. Upon the start, the authentication sever 3 is put into the standby state until receiving the authentication request from the information processing device 2 (step S50). In response to receiving the authentication request, the authentication sever 3 determines whether or not the request is the encrypted data (step S51). The request may be the encrypted data (when a result of step S51 is YES). In this case, the authentication sever 3 decrypts the received data with the predetermined decryption key (step S52), then determining if the data is decrypted normally (step S53). If the data is decrypted normally (when a result of step S53 is YES), the authentication server 3 extracts the one-time password sent with the decrypted authentication request as the attachment and performs authentication processing of the one-time password (step S54). The authentication server 3 may perform the authentication processing of the one-time password by determining whether or not the one-time password sent with the decrypted authentication request consists of letters listed on a predetermined random number table, for example. The authentication server 3 then determines whether or not the authentication of the one-time password results in success (step S55). When the authentication results in success, the authentication server 3 extracts the information (for instance, the user ID) included in the authentication request (step S56), and determines if the extracted information is registered with the authentication registration information 34 (step S57). If the same information is registered with the authentication registration information 34 (when a result of step S57 is YES), the user authentication results in success (step S58). The authentication server 3 is then allowed to identify the user as the registered user. The authentication server 3 extracts the authority information 34c set for the registered user from the authentication registration information 34 (step S59), then sending the authentication result to the information processing device 2 (step S60). If the information included in the authentication request is not registered with the authentication registration information 34 (when a result of step S57 is NO), the user authentication results in failure (step S61). The authentication server 3 is not allowed to identify the user as the registered user, so it sends the authentication result showing that the authentication results in failure to the information processing device 2 (step S60).

If the encrypted data thereby received may not be decrypted normally (when a result of step S53 is NO), or the authentication of the one-time password may result in failure (when a result of step S55 is NO). In such cases, the authentication server 3 determines that the user authentication results in failure without referring to the authentication registration information 34 (step S61). In also this case, the authentication server 3 is not allowed to identify the user as the registered user, so it sends the authentication result showing that the authentication results in failure to the information processing device 2 (step S60).

The authentication request from the information processing device 2 may not be the encrypted data (when a result of step S51 is NO). In such a case, the authentication server 3 extracts all of the information (for instance, the user ID and the password) included in the received authentication request (step S56), and performs the user authentication based on the extracted information (step S57). The authentication server 3 then performs the processing in steps S58 to S61 as described above based on the result of the user authentication.

As described above, the authenticating system 1 of the first preferred embodiment comprises the information processing device 2 and the authentication server 3 connected over the network. The information processing device 2 sends the authentication request to the authentication server 3, and the authentication server 3 performs the user authentication in response to the request. The authentication server 3 controls the operation state of the information processing device 2 in accordance with the result of the user authentication. The authentication server 3 of the authenticating system 1 with the above-described configuration stores therein in advance the authentication registration information 34. The user ID (identification information) used for identification of the user and the password consists of a character string are associated with each other and recorded with the authentication registration information 34. The authentication server 3 authenticates the user by determining whether or not the information included in the authentication request received from the information processing device 2 is registered with the authentication registration information 34. The information processing device 2 stores therein in advance the user registration information 17. The user ID (identification information) of each user registered with the authentication server 3 and the authentication information 17b except for the password are associated with each other and recorded with the user registration information 17. The authentication information 17b recorded with the user registration information 17 is the information such as the card information (recorded information) recorded on the IC card or the biological information of the user which cannot be changed easily. This is different from the password which can be changed easily. After the information processing device 2 acquires the aforementioned authentication information in response to the instruction by the user who is trying to use the information processing device 2, it runs a search through the user registration information 17 to acquire the user ID (identification information) which corresponds to the acquired authentication information and sends the authentication request including only the user ID to the authentication server 3. In response to receiving the authentication request including only the user ID, the authentication server 3 determines whether or not the user ID is registered with the authentication registration information 34, thereby authenticating the user. In this case, the authentication server 3 does not refer to the password registered with the authentication registration information 34 for the user authentication. The information processing device 2 switches its operation state to the logged-in state in accordance with the result of the aforementioned user authentication performed on the authentication server 3.

As described above, the authenticating system 1 of the first preferred embodiment does not require the authentication server 3 to store therein the authentication information of each user such as the card information (recorded information) or the biological information which cannot be changed easily by the user. As a result, it is allowed to prevent the leakage of the authentication information from the authentication server 3 installed on the public network before it occurs.

When the information processing device 2 of the first preferred embodiment receives the user ID and the password consist of a character string input by the user by manual, it generates the authentication request including the user ID and the password input by the user by manual and sends the generated authentication request to the authentication server 3. The authentication server 3 then determines whether or not both the user ID and the password included in the authentication request are registered with the authentication registration information 34, thereby authenticating the user. It is assumed, for example, the unauthorized user uses the operational panel 8 of the information processing device 2 to input the identification information matching the user ID registered with the authentication registration information 34 on the authentication server 3 by manual. Even in this case, if the password registered with the authentication registration information 34 does not match, the authentication results in failure. Thus, it may prevent unauthorized use by the unauthorized user.

The authentication information acquiring device 9 of the information processing device 2 of the first preferred embodiment is capable of acquiring multiple kinds of authentication information including the card information and the biological information. The user ID of the user registered with the authentication server 3 and the authentication information that is specified to be confidential are associated with each other, and the user ID and the corresponding authentication information are registered with the user registration information 17. If the authentication information other than the card information and the biological information, for instance, is specified in advance to be confidential, it may be prevented from being sent to the authentication server 3 with the authentication request. It is allowed to prevent in advance the leakage of the authentication information that is specified to be confidential from the authentication server 3.

For sending the authentication request including only the user ID to the authentication server 3, the information processing device 2 of the first preferred embodiment creates the one-time password that may be used for the authentication on the authentication server 3 and sends the created one-time password with the authentication request as the attachment. The information processing device 2 may send the authentication request including only the user ID to the authentication server 3. Even in this case, the authentication server 3 is allowed to use not only the user ID but also the one-time password to determine whether or not the user is one of the registered users for the user authentication. As a result, it may prevent a decrease in reliability of user authentication.

For sending the authentication request including only the user ID to the authentication server 3, the information processing device 2 of the first preferred embodiment encrypts the authentication request in a manner that may be decrypted on the authentication server 3 and sends the encrypted authentication request to the authentication server 3. Even in the case where the information processing device 2 sends the authentication request including only the user ID to the authentication server 3, it may prevent a decrease in reliability of user authentication.

Second Preferred Embodiment

A second preferred embodiment of the present invention is described next. The authentication information acquired with the authentication information acquiring device 9 may be the card information (recorded information) recorded on the IC card carried by each user. According to the second preferred embodiment, the user authentication having the higher reliability than that of the above-described first preferred embodiment in the aforementioned case is described.

Figure 9:
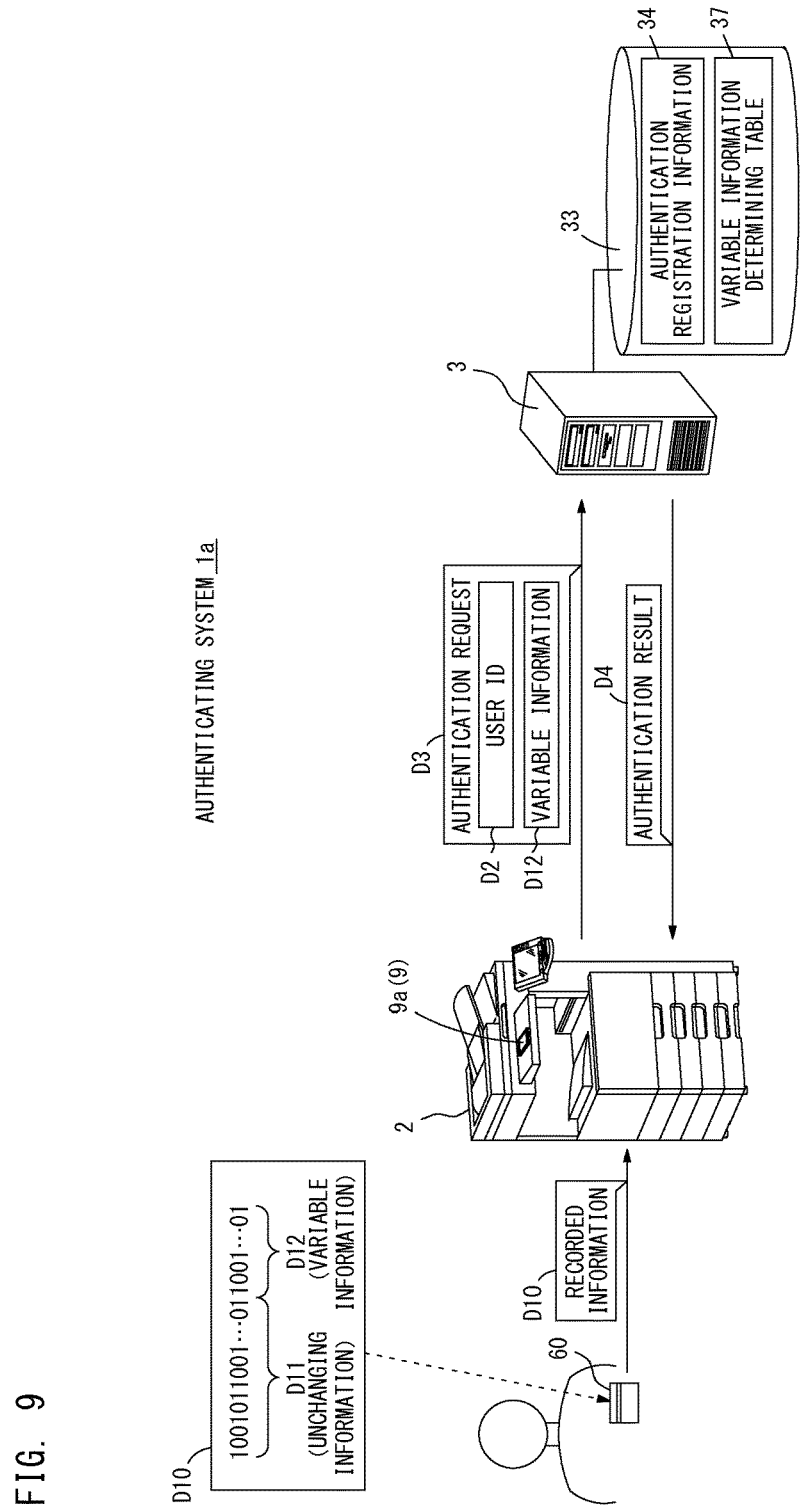
FIG. 9 shows an exemplary configuration of the authenticating system of a second preferred embodiment.

FIG. 9 shows an exemplary configuration of an authenticating system 1*a* of the second preferred embodiment. The user trying to use the information processing device 2 places an IC card 60 carried by the user on the card reader 9*a* which is provided with the information processing device 2 as the authentication information acquisition device 9, thereby making the information processing device 2 read recorded information D10 recorded on the IC card 60 as the authentication information. The recorded information D10 includes unchanging information D11 and variable information D12 as illustrated in FIG. 9. The unchanging information D11 is assigned to the individual user for identifying each user, for example. This unchanging information D11 can never be rewritten. On the other hand, the variable information D12 can be rewritten depending on the transfer of the users, for example. As one of examples, the variable information D12 may be the information that is rewritten every time the user passes a gate to each office in the high security office environment and that may be used as location information indicating the user's present location.

After reading the recorded information D10 recorded on the IC card 60, the information processing device 2 extracts the authentication information from the unchanging information D11 included in the recorded information D10. The information processing device 2 further extracts the variable information D12 included in the recorded information D10. The identification information acquiring part 23 runs a search through the user registration information 17 based on the extracted authentication information, thereby acquiring the user ID as the identification information of the user corresponding to the authentication information and converting the authentication information to the identification information D2. The authentication requesting part 24 generates the authentication request D3 including the identification information D2 and the variable information D12 extracted from the recorded information D10, then sending the generated authentication request D3 to the authentication server 3.

The authentication server 3 of the second preferred embodiment is provided with the storage device 33 on which the aforementioned authentication registration information 34 and a variable information determining table 37 are stored. The variable information determining table 37 is automatically rewritten by a gate system that is not illustrated in figures. The gate system is installed on a doorway to each office. The variable information determining table 37 is, for instance, table information including the user ID for identifying the user and the user's present location. In response to receiving the authentication request D3 including the identification information D2 (user ID) for identification of the user and the variable information D12, the authentication server 3 is allowed to determine whether or not the user is one of the registered users based on the user ID. Also, the authentication server 3 is allowed to determine whether or not the user's present location indicated by the variable information D12 matches the user's present location recorded on the variable information determining table 37. As a result, for user authentication on the authentication server 3 of the second preferred embodiment, the authentication server 3 is allowed to identify the user as the one registered in advance with the authentication server 3 based on the user ID. Furthermore, the result of the user authentication depends on whether or not the user's present location matches. More specifically, even when the user is identified as the one registered with the authentication server 3 based on the user ID, the user's present location may not match. In such a case, the user authentication may result in failure by considering it has received the unauthorized authentication request. The authentication server 3 then determines the user's present location and sends the authentication result D4 of the user authentication to the information processing device 2.

Even when the authentication information recorded on the IC card 60 is leaked out, the authenticating system 1*a* of the second preferred embodiment is allowed to prevent unauthorized use of the information processing device 2 by using the authentication information, resulting in authenticating system with higher-level of security.

As described above, in response to acquiring the authentication information except for the password, the information processing device generates the authentication request including the identification information corresponding to the authentication information and sends the generated authentication request to the authentication server. It, therefore, is not necessary to store the authentication information except for the password such as the card information and/or the biological information in advance on the authentication server installed on the network. As a result, it may prevent a leakage of the authentication information except for the password from the authentication server.

(Modifications)

While the preferred embodiments of the present invention have been described above, the present invention is not limited to the preferred embodiments. Various modifications may be applied to the present invention.

In the above-described preferred embodiments, the information processing device 2 is shown to be one of MFPs with multiple functions such as copy function, scan function and print function, for example. The information processing device 2 is not necessarily the device such as the MFPs including multiple functions. To be more specific, the information processing device 2 may be a device with single function such as devices including a specialized copier, a specialized scan device, a specialized printer and a specialized fax device.

In the above-described preferred embodiments, the information processing device 2 connected to the local network 4 sends the authentication request to the authentication server 3. The authentication request is not necessarily directly sent from the information processing device 2 to the authentication server 3. Another authentication relay server may be installed on the local network 4, and the authentication request may be sent from the information processing device 2 to the authentication server 3 via another authentication relay server.

Figure 10:
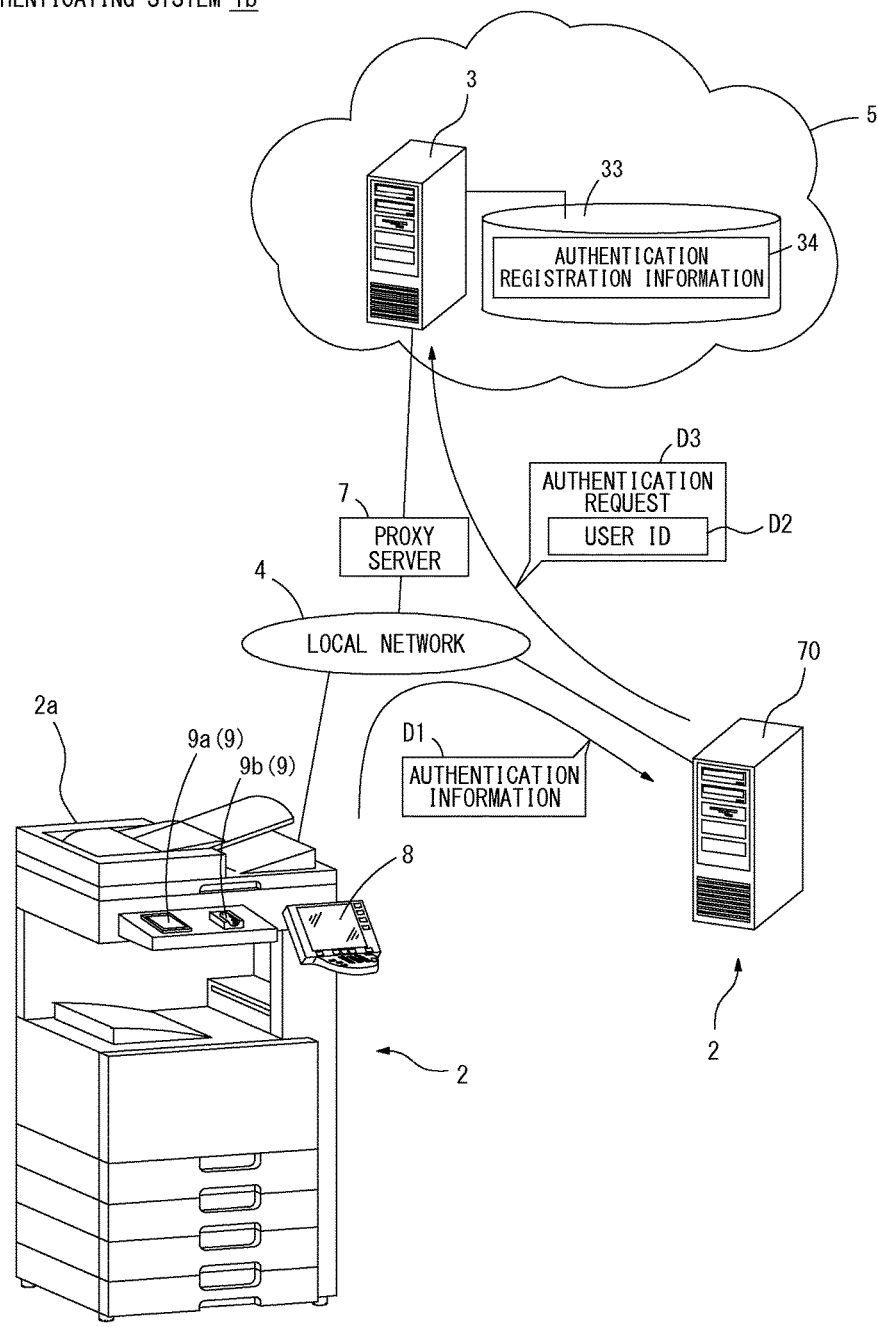
FIG. 10 shows an exemplary modified configuration of the authenticating system.

FIG. 10 shows an exemplary configuration of an authenticating system 1*b*, on which the authentication request is sent via an authentication relay server 70. The authenticating system 1*b* comprises an information processing devices 2*a* and the authentication relay server 70 connected to the local network 4. The information processing device 2*a* and the authentication relay server 70 work together to serve as the information processing device 2 of the above-described first and second preferred embodiments. To be more specific, after the authentication information acquisition device 9 acquires the authentication information D1 by reading the card information and/or the biological information, the information processing device 2*a* sends the acquired authentication information D1 to the authentication relay server 70. The authentication relay server 70 stores therein the aforementioned user registration information 17, and serves as the above-described authenticating part 22 (see FIG. 2). In response to receiving the authentication information D1 from the information processing device 2*a*, the authentication relay server 70 refers to the user registration information 17 based on the received authentication information D1, thereby generating the authentication request D3 to which the user ID, the identification information D2 of the user, is attached and sending the generated authentication request D3 to the authentication server 3. After receiving the authentication request D3 from the authentication relay server 70, the authentication server 3 performs user authentication as described above and sends the result of the user authentication to the authentication relay server 70. In response to receiving the result of the user authentication from the authentication server 3, the authentication relay server 70 switches the operation state of the information processing device 2a to the logged-in state in accordance with the result of the aforementioned user authentication performed on the authentication server 3. Thus, even the authenticating system 1b as illustrated in FIG. 10 does not require the authentication information D1 which cannot be changed easily to be sent to the authentication server 3 on the cloud 5 for user authentication. As a result, it is allowed to prevent a leakage of the authentication information D1 from the authentication server 3.

In the above-described preferred embodiments, the authentication server 3 is installed on the cloud 5 of the public outside network such as an internet, for example. The authentication server 3 is not necessarily installed on the cloud 5. To be more specific, the present invention is for prevention of the leakage of the authentication information such as the card information and/or the biological information from the authentication server 3 installed by connecting to some kind of the network to control the overall user authentication. The authentication server 3, therefore, is not always installed on the public cloud 5.

What is claimed is:

1. An authenticating system comprising an information processing device and an authentication server connected over a network, wherein
said authentication server includes:
a first storage device for storing authentication registration information which includes identification information used for identification of a user which is recorded in advance of authentication of the user; and
a first processor configured to authenticate the user by determining whether or not information included in an authentication request received from said information processing device is registered with said authentication registration information, said authentication request received from said information processing device being devoid of biological information about the user and said first processor authenticating the user without using biological information, and
said information processing device includes:
a second storage device for storing user registration information which includes said identification information of each user and a second kind of authentication information, said identification information and said second kind of authentication information being recorded in advance of authentication of the user and in association with each other;
an authentication information acquiring part for acquiring said second kind of authentication information based on receiving a user's instruction;
a second processor configured to:
acquire said identification information corresponding to said acquired second kind of authentication information by running a search through said user registration information after said second kind of authentication information is acquired by said authentication information acquiring part;
generate the authentication request, wherein the authentication request includes said identification information, and send the generated authentication request to said authentication server without sending the second kind of authentication information to the authentication server;
receive a result of authentication from said authentication server based on the authentication request which is sent by said second processor; and
put said information processing device into a logged-in state in accordance with the result of the authentication received by said second processor.

2. The authenticating system according to claim 1, wherein:
said information processing device further includes a manipulation input unit that receives an input of said identification information and a first kind of authentication information based on a manual input by the user, the first kind of authentication information being different than the second kind of authentication information, and
the authentication request includes said identification information and said first kind of authentication information which are manually input by the user and the second processor sends the authentication request to said authentication server when the input of said identification information and said first kind of authentication information is received by said manipulation input unit.

3. The authenticating system according to claim 1, wherein
said authentication information acquiring part acquires said second kind of authentication information by reading recorded information on a portable recording medium carried by the user.

4. The authenticating system according to claim 3, wherein
said recorded information includes unchanging information which cannot be rewritten and variable information which can be rewritten,
said authentication information acquiring part extracts said authentication information from said unchanging information included in said recorded information and said variable information from said recorded information, and
said second processor generates the authentication request including said identification information corresponding to said authentication information acquired by said second processor and said variable information extracted by said authentication information acquiring part, and sends the generated authentication request to said authentication server.

5. The authenticating system according to claim 1, wherein
said authentication information acquiring part acquires said authentication information by reading biological information showing a personal feature of the user.

6. The authenticating system according to claim 1, wherein
said authentication information acquiring part is capable of acquiring multiple kinds of information as said second kind of authentication information, and
said user registration information is information with which said identification information of each user registered with said authentication server and the second kind of authentication information which is one of said multiple kinds of information that can be acquired by said authentication information acquiring part are registered.

7. The authenticating system according to claim 1, wherein
said second processor creates a one-time password which can be used for authentication by said authentication server and sends with the authentication request as an attachment when generating said authentication request including said identification information acquired by said second processor and sending the generated authentication request to said authentication server.

8. The authenticating system according to claim 1, wherein
said second processor encrypts the authentication request in a manner that can be decrypted by said authentication server and sends the encrypted authentication request to said authentication server when generating the authentication request including said identification information acquired by said second processor and sending the generated authentication request to said authentication server.

9. An information processing device, comprising:
a storage device storing user registration information, the user registration information including identification information of each user and authentication information, said identification information and said authentication information being recorded in advance of authentication of a user and n association with each other;
an authentication information acquiring part for acquiring said authentication information based on receiving a user's instruction;
a processor configured to:
acquire said identification information corresponding to said acquired authentication information by running a search through said user registration information after said authentication information is acquired by said authentication information acquiring part;
generate an authentication request including said identification information acquired by said identification information acquiring part and send the generated authentication request to an authentication server, without sending the authentication information to the authentication server, the generated authentication request sent to the authentication server being devoid of biological information about the user and said authentication server authenticating the user without using biological information;
receive the result of the authentication from said authentication server, which is performed without using biological information, based on the authentication request sent by said processor; and
put the operation state into a logged-in state in accordance with the result of the authentication received by said processor.

10. The information processing device according to claim 9, further comprising:
a manipulation input unit that receives an input of said identification information and a password based on a manual input by the user, and
said processor generates the authentication request including said identification information and said password which are manually input by the user and sends the authentication request to said authentication server when the input of said identification information and said password is received by said manipulation input unit.

11. The information processing device according to claim 9, wherein
said authentication information acquiring part acquires said authentication information by reading recorded information on a portable recording medium carried by the user.

12. The information processing device according to claim 11, wherein
said recorded information includes unchanging information which cannot be rewritten and variable information which can be rewritten,
said authentication information acquiring part extracts said authentication information from said unchanging information included in said recorded information and said variable information from said recorded information, and
said processor generates the authentication request including said identification information corresponding to said authentication information acquired by said identification information acquiring part and said variable information extracted by said authentication information acquiring part and sends the generated authentication request to said authentication server.

13. The information processing device according to claim 9, wherein
said authentication information acquiring part acquires said authentication information by reading biological information showing a personal feature of the user.

14. The information processing device according to claim 9, wherein
said authentication information acquiring part is capable of acquiring multiple kinds of information as said authentication information, and
said user registration information is information with which said identification information of each user registered with said authentication server and the authentication information which is one of said multiple kinds of information that can be acquired by said authentication information acquiring part are registered.

15. The information processing device according to claim 9, wherein
said processor creates a one-time password which can be used for authentication by said authentication server and sends with the authentication request as an attachment when generating the authentication request including said identification information acquired by said identification information acquiring part and sending the generated authentication request to said authentication server.

16. The information processing device according to claim 9, wherein
said processor encrypts the authentication request in a manner that can be decrypted by said authentication server and sends the encrypted authentication request to said authentication server when generating the authentication request including said identification information acquired by said processor and sending the generated authentication request to said authentication server.

17. An authenticating method of causing an information processing device to send an authentication request to an authentication server, and said authentication server to perform user authentication based on the authentication request, thereby controlling an operation state of said information processing device in accordance with a result of the user authentication, in a network that said information processing device and said authentication server are connected to each other, the method comprising:
- (a) registering authentication registration information which includes identification information used for identification of a user which is recorded in advance of the user authentication;
- (b) registering user registration information which includes said identification information of each user and a second kind of authentication information with said information processing device, said identification information and said second kind of authentication information being recorded in advance of the user authentication and in association with each other;
- (c) acquiring said second kind of authentication information by said information processing device based on receiving a user's instruction;
- (d) acquiring said identification information corresponding to said second kind of authentication information by running a search through said user registration information after said second kind of authentication information is acquired by said information processing device;
- (e) generating the authentication request including said identification information and sending the generated authentication request to said authentication server when said identification information corresponding to said authentication information is acquired by said information processing device without sending the second kind of authentication information to the authentication server, the generated authentication request sent to the authentication server being devoid of biological information about the user;
- (f) authenticating the user by determining whether or not information included in the authentication request is registered with said authentication registration information after the authentication request is received by said authentication server from said information processing device, the authentication server performing the authenticating of the user without using biological information;
- (g) receiving the result of the user authentication sent from said authentication server by said information processing device; and
- (h) putting an operation state of said information processing device into a logged-in state in accordance with the result of the user authentication received on said information processing device.

18. A non-transitory computer readable recording medium on which a program is recorded, said program executable on an information processing device capable of establishing communication with an authentication server which manages identification information of each user which is recorded in advance of authentication by a user, and said program causing said information processing device to execute the steps of:
- (a) generating user registration information with which said identification information of each user and a second kind of authentication information are registered, and storing said generated user registration information in a predetermined storage part, said identification information and said second kind of authentication information being recorded in advance of authentication of the user and in association with each other;
- (b) acquiring said second kind of authentication information based on receiving a user's instruction;
- (c) acquiring said identification information corresponding to said second kind of authentication information by running a search through said stored user registration information after said second kind of authentication information is acquired based on receiving the user's instruction;
- (d) generating an authentication request including said identification information and sending the generated authentication request to said authentication server after said identification information corresponding to said second kind of authentication information is acquired without sending the second kind of authentication information to the authentication server, the generated authentication request sent to the authentication server being devoid of biological information about the user;
- (e) receiving a result of the authentication from said authentication server after sending the authentication request, the authentication server authenticating the user without using biological information; and
- (f) putting an operation state into a logged-in state in accordance with said received result of the authentication.

19. The non-transitory computer readable recording medium according to claim 18, wherein the steps include:
receiving an input of said identification information and a first kind of authentication information based on a manual input by a user, the first kind of authentication information being different than the second kind of authentication information, and
the authentication request includes said identification information and said first kind of authentication information which are manually input by the user and sending the authentication request to said authentication server when the input of said identification information and said first kind of authentication information is received by a manipulation input unit.

20. The non-transitory computer readable recording medium according to claim 18, wherein the generated authentication request does not include the second kind of authentication information.

21. The authenticating system according to claim 1, wherein the first storage device further stores a first kind of authentication information in advance of authentication of the user, the first kind of authentication information being recorded in association with the identification information, the first kind of authentication information being different than the second kind of authentication information.

22. The authenticating system according to claim 1, wherein the identification information is specific to a user.

23. The authenticating system according to claim 21, wherein the first kind of authenticating information is a password.

24. The authenticating method according to claim 17, wherein the registering of the authentication registration information further includes registering a first kind of authentication information with the authentication server, the first kind of authentication information being recorded in advance of the user authentication and in association with the identification information, the first kind of authentication information being different than the second kind of authentication information.

25. The non-transitory computer readable recording medium according to claim 18, wherein the authentication server further manages a first kind of authentication information which is recorded in advance of authentication by a user and in association with the identification information, the first kind of authentication information being different than the second kind of authentication information.

26. An authenticating system comprising an information processing device and an authentication server connected over a network, wherein said authentication server includes:

a first storage device for storing authentication registration information which includes identification information used for identification of a user and a first kind of authentication information, wherein the identification information and the first kind of authentication information are recorded in advance of authentication of the user and in association with each other;

a first processor configured to authenticate the user by determining whether or not information included in an authentication request received from said information processing device is registered with said authentication registration information, the authentication request including said identification information and said first kind of authentication information; and the identification information being a user ID and the first kind of authentication information being a password; and said information processing device includes:

a second storage device for storing user registration information which includes said identification information of each user and a second kind of authentication information, said identification information and said second kind of authentication information being recorded in advance of authentication of the user and in association with each other, and wherein said first kind of authentication information is distinct from said second kind of authentication information;

an authentication information acquiring part for acquiring said second kind of authentication information based on receiving a user's instruction;

a second processor configured to:

acquire said identification information corresponding to said acquired second kind of authentication information by running a search through said user registration information after said second kind of authentication information is acquired by said authentication information acquiring part;

generate the authentication request, wherein the authentication request includes said identification information and said first kind of authentication information which are manually input by the user, and send the generated authentication request to said authentication server without sending the second kind of authentication information to the authentication server;

receive a result of authentication from said authentication server based on the authentication request which is sent by the second processor; and put said information processing device into a logged-in state in accordance with the result of the authentication received by the second processor.

27. The authenticating system according to claim 26, wherein the authentication request received from the information processing device is devoid of biological information about the user and the first processor authenticates the user without using biological information.

28. An authenticating system comprising an information processing device and an authentication server connected over a network, wherein said authentication server includes:

a first storage device for storing authentication registration information which includes identification information used for identification of a user and a first kind of authentication information, wherein the identification information and the first kind of authentication information are recorded in advance of authentication of the user and in association with each other; and a first processor configured to authenticate the user by determining whether or not information included in an authentication request received from said information processing device is registered with said authentication registration information, and said information processing device includes:

a second storage device for storing user registration information which includes the identification information of each user and a second kind of authentication information, the identification information and the second kind of authentication information being recorded in advance of authentication of the user and in association with each other, and wherein the first kind of authentication information is distinct from the second kind of authentication information;

an authentication information acquiring part for acquiring the first kind of authentication information or the second kind of authentication information;

a second processor configured to:

acquire the identification information corresponding to the acquired second kind of authentication information by running a search through the user registration information when the second kind of authentication information is acquired by the authentication information acquiring part;

generate the authentication request, wherein the authentication request includes one of the first kind of authentication information acquired by the authentication information acquiring part and the identification information acquired by the second processor, and wherein the authentication request does not include the second kind of authentication information;

send the authentication request to the authentication server;

receive a result of authentication from said authentication server based on the authentication request which is sent by the second processor; and put said information processing device into a logged-in state in accordance with the result of the authentication received by the second processor.

* * * * *